Oct. 14, 1930.  E. NIBBS  1,778,200
PISTON AND RING MOUNTING THEREFOR
Filed Dec. 17, 1927
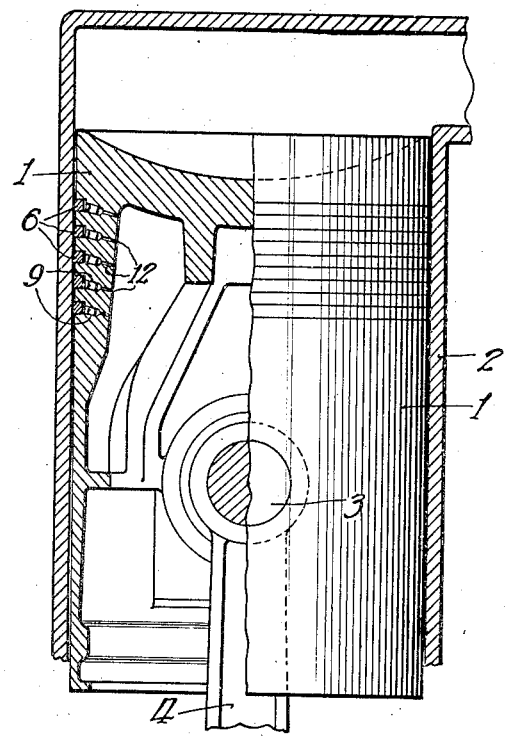
Fig. 1
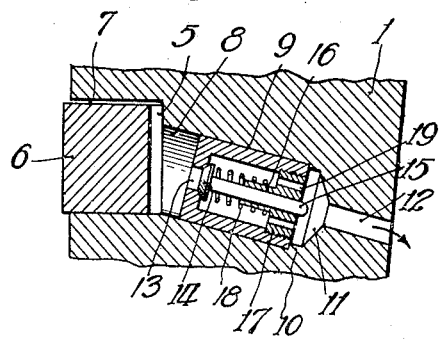
Fig. 2
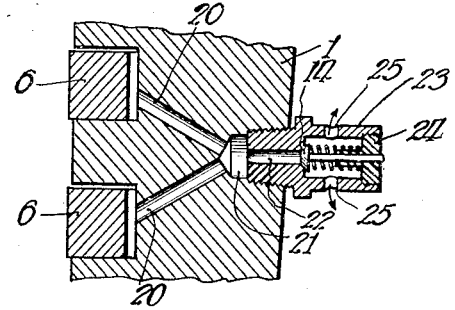
Fig. 3
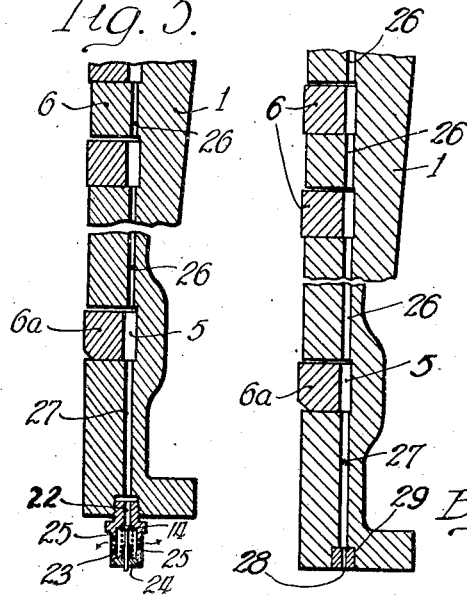
Fig. 5
Fig. 4
Inventor
Ernest Nibbs.
By Brown Jackson Boettcher
& Dienner Attys Patented Oct. 14, 1930

1,778,200

UNITED STATES PATENT OFFICE

ERNEST NIBBS, OF NEW LONDON, CONNECTICUT, ASSIGNOR TO ELECTRIC BOAT COMPANY, OF GROTON, CONNECTICUT, A CORPORATION OF NEW JERSEY

PISTON AND RING MOUNTING THEREFOR

Application filed December 17, 1927. Serial No. 240,662.

This invention relates to pistons for internal combustion engines, and more particularly to means for mounting the rings on the piston.

In internal combustion engines difficulty is encountered in obtaining the proper fit between the cylinder lining and the piston rings to prevent leakage of the gases while avoiding excessive wear of the rings and the lining. The rings are held tight against the cylinder wall by the pressure of the gases which collect in the ring groove in back of the ring, this pressure holding the ring tightly against the cylinder wall so as to prevent leakage of gases between the rings and the cylinder wall. The gases obtain access to the space in back of the ring by way of the space left between the rings and the walls of the ring groove. In a vertical engine with a downwardly acting pressure stroke, the gases enter between the upper surface of the ring and the ring groove. To a somewhat less extent the gases also flow between the ends of the rings into the back space. If a ring is so well fitted in its groove that the clearance is only sufficient to allow of turning of the ring in the groove by appreciable pressure by the hand, the gases will flow between the ring and the cylinder wall more readily than between the ring and the walls of the groove into the back space with the result that the pressure will cause the ring to collapse in its groove away from the wall resulting in excessive gas leakage. On the other hand, if the gases can flow into the back space as easily as between the face of the ring and the cylinder wall, the natural spring tension of the ring is all that tends to keep it pressed against the cylinder wall. This is insufficient and as a result the ring will either collapse in its groove or press harder against the wall of the cylinder, according as to whether the pressure due to leakage between the face of the ring and the cylinder wall exceeds or is less than the pressure at the back of the ring resulting from the flow of the gases thereto.

It is the present practice to mount piston rings with sufficient clearance to allow the gases to flow into the back space behind the ring, this clearance being in addition to that due to the conjunction of heat condition and mechanical reasons. In a vertical type of engine the ring groove wears in a vertical direction, due to the alternate position of the ring against the top and the bottom of the groove in the operation of the piston. As a consequence of this wearing of the ring groove, the mean pressure at the back of the ring increases with time with the result that the cylinder liner and piston ring both wear at an increased rate. This method of mounting the ring is also objectionable in that the ring is not held at all times firmly against the cylinder wall and the pressure of the ring against this wall may at times be excessive resulting in objectionable wear of both the ring and the liner, as noted. I have found that these various objections can be avoided by providing means whereby the pressure in back of the ring is maintained at a substantially constant value such as to at all times hold the ring snugly against the wall of the cylinder without exerting excessive pressure thereon, the gases having free access to the back space behind the ring. In accordance with my invention, I mount the ring in such manner that the gases from the working space of the cylinder can flow freely into the back space behind the ring, and I provide an outlet extending from this back space to a point exterior of the working space of the cylinder, means being provided whereby the flow of gases through this outlet is restricted in such manner as to maintain the pressure of the gases in the back space behind the ring, during the working stroke of the piston, substantially constant and of a proper value to hold the face of the ring tightly against the wall of the cylinder without creating excessive pressure thereon. During the compression stroke of the piston, the mixture of gases and fuel vapors will also flow into the back space behind the ring so as to exert pressure thereon and hold the ring firmly against the cylinder wall in the same manner as it is held by the pressure in the back space during the working or combustion stroke. My invention can be applied to all of the rings and the ring grooves in a piston or only to such of the rings as cause the greatest wear, as desired. Further objects and advantages of my invention will appear from the detailed description.

In the drawings:

Fig. 1 is a sectional view through a cylinder showing a piston and the rings therefor constructed and applied in accordance with my invention, operating in the cylinder; the piston being partly broken away;

Fig. 2 is a fragmentary sectional view, on an enlarged scale, through the piston showing the ring and associated parts, parts being in elevation;

Fig. 3 is a view similar to Fig. 2 of a modified form;

Fig. 4 is a fragmentary sectional view through the piston and rings showing a second modified form of the invention; and Fig. 5 is a view similar to Fig. 4 of a third modified form of the invention.

My invention is shown as applied to a piston 1 of known type operating in a vertical cylinder 2, such as that of an internal combustion engine. This piston is operatively connected by a wrist pin 3 and a connecting rod 4 to the crank shaft (not shown) of the engine in a known manner. The piston is provided with a plurality of ring grooves 5 for reception of rings 6 which press against the inner wall of the cylinder to form a fluid tight closure therewith. In accordance with my invention, the ring 6 is of such vertical height or thickness as to leave a space 7 between the top of the ring and the top wall of the ring groove 5. This space is of such size as to permit the gases flowing between the piston head and the cylinder wall to enter this space and flow freely into the back space of groove 5 behind the ring 6. This insures that the gases can flow into the back space behind the ring without being obstructed so that there is no appreciable tendency of these gases to flow between the face of the ring and the cylinder wall. As a result the pressure in the back space is maintained substantially constant during the operation of the engine and is always in excess of any counter pressure which may be exerted by gases which may tend to leak between the face of the ring and the cylinder wall. In view of the fact that the gases have free access to the back space, the pressure exerted by the gases in this space would be excessive and would press the face of the ring against the cylinder wall so tightly as to cause excessive wear of the ring and the wall if means were not provided for regulating this pressure.

Referring more particularly to Figure 2 the piston is provided with a bore 8 extending from the back of ring groove 5, this bore being preferably, though not necessarily, inclined downwardly and inwardly of the piston 1. The bore 8 receives a cylindrical valve casing 9 which fits snugly within the bore and seats at its lower end on a shoulder 10 disposed between the lower end of bore 8 and a frusto-conical recess 11 below the bore. An outlet opening or passage 12 extends from the apex of recess 11 and opens into the interior space of piston 1. Valve casing 9 is provided, at its outer end, with an escape opening 13, the inner portion of which is shaped to provide a valve seat which cooperates with a valve 14 for normally closing the opening 13. This valve is provided with a stem 15 which operates through a guide element 16 extending from a plug 17 threaded or otherwise suitably secured in the lower end of valve casing 9. An expansion coil spring 18 is disposed about element 16 and valve stem 15 and is confined between the valve head and plug 17. This plug is provided with suitable escape openings 19. Spring 18 is of such strength, and the plug 17 is so adjusted, that the valve 14 is normally held in closed position, but will open when the pressure of the gases in the back space between the ring 6 and the inner wall of groove 5 exceeds the predetermined maximum pressure. When the valve 14 opens the gases escape through the casing 9 and openings 19 into the space 11 and then through the passage or outlet opening 12 into the interior of piston 1 from which the gases may flow into the crank case or any other space of substantially atmospheric pressure; or may flow into the atmosphere in cases where the interior of the piston has direct communication with the atmosphere. This gives an automatic control of the pressure in back of the piston ring which assures that the ring is kept tight at all times to prevent leakage between the face of the ring and the cylinder wall, while avoiding excessive pressure of the ring with consequent wear of the ring and the cylinder wall.

In the modified form illustrated in Figure 3, I have shown two passages 20 extending from the back space of two adjacent ring grooves, these passages opening at their inner end to a space 21 in the piston wall, this space being in communication with an outlet passage 22 extending from the outer end of a valve casing 23 which is screwed into the piston 1. The inner end of passage 22 is normally closed by valve 14 as before, the stem of which operates through a plug 24 screwed into the inner end of casing 23, this plug being similar to plug 17 except that it is not provided with any outlet opening. To permit escape of the gases from the casing 23 into the interior space of piston 1, the casing is provided with suitably spaced escape openings 25 disposed radially thereof. In this form, the operation of the valve is the same as in the form illustrated in Figure 2 and serves to automatically maintain the pressure in the back space of the groove substantially constant and at a predetermined value sufficient to hold the ring tightly against the cylinder wall while preventing excessive pressure. In view of the fact that the passages 20 communicate with the space 21, each of the rings 6 is subjected to equal pressure which is of advantage in obtaining uniform wear of these rings, as well as of the cylinder wall.

In the modified form illustrated in Figure 4, the channels 5 are connected by ducts 26 disposed lengthwise of piston 1 and adjacent the inner or back walls of the channels. An outlet passage 27 extends from the back of the lowermost channel or ring groove 5 and discharges through a restricted escape opening 28 in a thimble 29 of brass or other suitable metal which is suitably secured in the lower end of piston 1. The escape opening 28 is of such size as to maintain the pressure of the gases in the back spaces behind the rings 6 substantially constant and at a predetermined maximum value during the operation of the engine. In this form, as in the form of Figure 3, the pressure behind the rings 6 is equalized so that the wear of the rings and the cylinder walls is uniform.

As is known, the upper rings of the piston, in a vertical type of engine, are subjected to the greatest pressure due to flow of the gases into the back spaces behind these rings. Under certain conditions it is desirable to transfer the pressure from behind certain of the upper rings to the back space behind the lower wiper ring 6ª to build up pressure behind this ring. This construction is similar to that of Fig. 4 in its broader aspects but differs therefrom in that the gases do not have free flow from behind the wiper ring 6ª to the crank case, or the atmosphere, as the case may be. Referring to Fig. 5, it will be noted that the nipple 29 of Fig. 4 is replaced by a valve structure similar to that of Fig. 3. The valve 14 may be adjusted to open at a predetermined maximum pressure in the back space behind ring 6ª, or it may be so adjusted as to not open at the maximum pressure which would occur in back of ring 6ª during normal operation of the engine. The adjustment of this valve will depend largely on the characteristics of the particular engine to which my invention is applied. The valve acts to prevent escape of the gases from behind ring 6ª until after the pressure in back of this ring reaches such value as to hold the ring against the cylinder wall under proper pressure to assure most efficient operation. If the characteristics of the engine are such that this pressure will not be exceeded to any material extent, the valve may be so adjusted as not to open during the normal operation of the engine acting, in effect, as a permanent closure. In its broader aspects, therefore, my invention contemplates relieving the upper rings of excess pressure by transferring a portion of the pressure from the rings subjected to greatest pressure to the rings subjected to relatively low pressures thus tending to equalize the pressure to which all of the rings are subjected.

I have illustrated and described my invention as applied to the piston of an internal combustion engine, merely by way of example. My invention is also well adapted for use in other fields in which a piston provided with packing rings operates in a cylinder either under pressure or against pressure as, for instance, in pumps or compressors. As above indicated, and as will be understood by those skilled in the art, changes in construction and arrangement of parts of my invention may be resorted to without departing from the field and scope of the same, and I intend to include all such variations, as fall within the scope of the appended claims, in this application in which the preferred forms only of my invention are disclosed.

What I claim is:—

1. In combination in a single acting internal combustion engine, a cylinder, a piston operating in the cylinder and having ring grooves, rings mounted in the grooves and spaced from the body wall of the piston providing back spaces behind the rings, the space between one end of the piston and the corresponding end of the cylinder constituting the combustion space of the cylinder, and means for discharging the gases from said back spaces into the cylinder at the other end of the piston, said means restricting the flow of such gases.

2. In combination in an internal combustion engine, a cylinder, a piston operating in the cylinder and having ring grooves, said piston being closed at the combustion chamber end thereof and being open at its other end, rings mounted in the grooves and spaced from the body wall of the piston providing back spaces behind the rings, passages in the piston leading from said spaces and discharging the gases therefrom at the open end of the piston, and means for restricting the flow of gases through said passages.

3. In combination in an internal combustion engine, a cylinder, a piston operating in the cylinder and comprising a hollow body open at one end and closed at its other end, said piston having ring grooves, rings mounted in the grooves and spaced from the inner walls thereof providing back spaces behind the rings, passages in the body wall of the piston leading from said spaces and opening into the body space, and means restricting the flow of gases through said passages.

4. In combination in an internal combustion engine, a cylinder, a piston open at one end and operating in the cylinder and having ring grooves, rings mounted in the grooves and spaced from the body wall of the piston providing back spaces behind the rings, communicating passages in the piston leading from said spaces and discharging the gases therefrom at the open end of the piston, and means for restricting the flow of gases through said passages.

5. In combination in an internal combustion engine, a cylinder, a piston open at one end and operating in the cylinder and having ring grooves, rings mounted in the grooves and spaced from the body wall of the piston providing back spaces behind the rings, passages in the piston leading from said spaces and discharging the gases therefrom at the open end of the piston, and loaded valve means for restricting the flow of gases through said passages.

6. In combination, a cylinder, a piston operating in the cylinder and having ring grooves, rings mounted in the grooves and spaced from the body wall of the piston providing back spaces behind the rings, passages in the piston leading from said spaces and discharging the gases therefrom at the nonworking side of the piston and into the cylinder, and means for restricting the flow of gases through said passages.

7. In combination, a cylinder, a piston operating in the cylinder and having ring grooves, rings mounted in the grooves and spaced from the body wall of the piston providing back spaces behind the rings, passages in the piston leading from said spaces and discharging the gases therefrom at the nonworking side of the piston and into the cylinder, and spring pressed valve means for restricting the flow of gases through said passages.

In witness whereof, I hereunto subscribe my name this 10th day of December, 1927.

ERNEST NIBBS.